US009410807B2

(12) United States Patent
Savarit et al.

(10) Patent No.: US 9,410,807 B2
(45) Date of Patent: Aug. 9, 2016

(54) METHOD FOR DETERMINING AN OFFSET LATERAL TRAJECTORY FOR AN AIRCRAFT

(71) Applicant: THALES, Neuilly sur Seine (FR)

(72) Inventors: Vincent Savarit, Valence (FR); Emmanuel Dewas, Valence (FR); François Coulmeau, Valence (FR)

(73) Assignee: Thales, Courbevoie (FR)

( * ) Notice: Subject to any disclaimer, the term of this patent is extended or adjusted under 35 U.S.C. 154(b) by 86 days.

(21) Appl. No.: 13/936,034

(22) Filed: Jul. 5, 2013

(65) Prior Publication Data

US 2014/0012500 A1 Jan. 9, 2014

(30) Foreign Application Priority Data

Jul. 6, 2012 (FR) ..................................... 12 01922

(51) Int. Cl.
*G01C 21/00* (2006.01)
*G05D 3/00* (2006.01)
*G08G 5/00* (2006.01)

(52) U.S. Cl.
CPC .............. *G01C 21/00* (2013.01); *G08G 5/0039* (2013.01); *G08G 5/0021* (2013.01)

(58) Field of Classification Search
CPC ................................. G01C 21/00; G05D 3/00
USPC ................................. 701/537–538, 527–528
See application file for complete search history.

(56) References Cited

U.S. PATENT DOCUMENTS

| | | | | |
|---|---|---|---|---|
| 6,405,124 | B1 * | 6/2002 | Hutton | 701/467 |
| 8,193,948 | B1 | 6/2012 | Shapiro et al. | |
| 2005/0261808 | A1 * | 11/2005 | Artini et al. | 701/3 |
| 2008/0154490 | A1 * | 6/2008 | Hoofd et al. | 701/202 |
| 2008/0300737 | A1 * | 12/2008 | Sacle et al. | 701/3 |
| 2008/0300739 | A1 * | 12/2008 | Coulmeau et al. | 701/8 |
| 2008/0312777 | A1 | 12/2008 | Dey et al. | |
| 2012/0022724 | A1 * | 1/2012 | Botargues et al. | 701/8 |

FOREIGN PATENT DOCUMENTS

| | | | |
|---|---|---|---|
| EP | 1 598 641 | A1 | 11/2005 |
| EP | 1 953 728 | A1 | 8/2008 |
| FR | 2 939 505 | A1 | 12/2008 |
| FR | 2 939 883 | A1 | 12/2008 |

* cited by examiner

*Primary Examiner* — Yonel Beaulieu
*Assistant Examiner* — Martin Weeks
(74) *Attorney, Agent, or Firm* — Baker & Hostetler LLP

(57) ABSTRACT

In the field of the definition of a flight plan for an aircraft, a method is provided for determining an offset lateral trajectory from an initial lateral trajectory comprising a set of initial waypoints. The initial lateral trajectory and the offset lateral trajectory have two junction points in common, namely a point of entry and a point of exit. At least one of the junction points is distinct from the initial waypoints and from the current position of the aircraft. This first junction point can notably be defined so that the flight duration or the flight distance between the first and second junction points corresponds to a defined value.

3 Claims, 5 Drawing Sheets

METHOD FOR DETERMINING AN OFFSET LATERAL TRAJECTORY FOR AN AIRCRAFT

CROSS-REFERENCE TO RELATED APPLICATION

This application claims priority to foreign French patent application No. FR 1201922, filed on Jul. 6, 2012, the disclosure of which is incorporated by reference in its entirety.

FIELD OF THE INVENTION

The invention lies within the field of the definition of a flight plan for an aircraft. It relates to a method for determining an offset lateral trajectory from an initial lateral trajectory comprising a set of initial waypoints.

BACKGROUND

A flight plan is generally determined by a flight management system, commonly referred to as FMS. The FMS are installed these days on most civilian aircraft in order to assist the pilots in navigation. A flight plan is notably defined from departure and arrival points and a navigation database. It comprises a chronological sequence of waypoints described by their three-dimensional position and, possibly, a setpoint of altitude to be maintained, of speed to be maintained and/or of overflight time to be maintained. From the flight plan, the navigation database and a performance database of the aircraft, the FMS can determine a three-dimensional trajectory and a speed profile to be followed by the aircraft. The three-dimensional trajectory is formed by a series of segments linking the waypoints in pairs. The projection of the three-dimensional trajectory in a horizontal plane is called lateral trajectory and the projection of the three-dimensional trajectory in a vertical plane is called vertical trajectory or vertical profile. In practice, the lateral and vertical trajectories are often computed independently of one another. The lateral trajectory is computed initially as a function of the list of the waypoints in the flight plan. The vertical trajectory is then computed as a function of the lateral trajectory and of the altitude and speed conditions imposed by the flight plan and by the performance levels of the aircraft. Since the lateral and vertical trajectories are dependent (the turn radii of the curve segments of the lateral trajectory are a function of the ground speed predicted at the point by the vertical trajectory), the current systems perform a certain number of loopbacks to ensure the convergence of the 3D trajectory.

The three-dimensional trajectory of the aircraft is usually optimized in order to reduce the costs generated by the flight. These are notably costs linked to fuel consumption, the activity of the navigating personnel and the maintenance of the aircraft. In practice, the lateral trajectory is determined to offer the shortest possible distance between the departure and arrival points. For various reasons, for example because of the weather conditions along the trajectory, or the detection of a conflict with the trajectory of another aircraft, or else because of a procedure imposed in areas outside of radar coverage, provision is made to be able to offset the lateral trajectory by a certain distance, in one direction or in the other. This offset is commonly called "lateral offset" in the literature. At the present time, it is known practice to define a lateral offset in two different ways. The first type of lateral offset is called "max possible offset". It consists in constructing an offset trajectory starting from the current position of the aircraft, and continuing to the final waypoint that can be offset. Typically, the trajectory of an aircraft can be offset laterally as far as the landing runway approach phase. The second type of offset is called "offset from A to B". For this type of offset, the lateral trajectory is offset between a first waypoint or the current position of the aircraft, and a second waypoint, situated after the first point concerned. Each type of offset is defined by four parameters, namely the points of entry and exit of the offset trajectory, the distance between the initial trajectory and the offset trajectory, and the direction (right or left) in which the trajectory is offset.

As they are currently defined, the two types of offset do not allow for an accurate adjustment of the position of the offset trajectory in relation to the initial trajectory, that is to say of the point of entry and of the point of exit of the offset trajectory. Now, in certain situations, for example for long-haul flights, the consecutive waypoints may be relatively distant from one another, so that the pilot of the aircraft may be constrained to divert the aircraft from its initial trajectory over a much longer portion than that where the obstacle to be avoided is located. Furthermore, an offset of the lateral trajectory may be desired for reasons other than avoiding an obstacle. In particular, it may be necessary to fly along an offset trajectory in order to delay the time of arrival at a waypoint or at the landing runway, for example in the case of significant air traffic at a waypoint. In such a case, the parameters currently used do not make it possible to directly define the offset that makes it possible to obtain the desired delay duration.

SUMMARY OF THE INVENTION

One aim of the invention is notably to remedy all or some of the abovementioned drawbacks by making it possible to enrich the definition of an offset lateral trajectory.

To this end, the subject of the invention is a method for determining an offset lateral trajectory for an aircraft from an initial lateral trajectory comprising initial waypoints, the offset lateral trajectory comprising a first junction point with the initial lateral trajectory. According to the invention, the first junction point is distinct from the initial waypoints and from the current position of the aircraft. Furthermore, the offset lateral trajectory also comprises a second junction point with the initial lateral trajectory, an offset waypoint for each initial waypoint situated between the first and second junction points, and a portion passing through the offset waypoints, said portion being situated at a defined offset distance from the initial lateral trajectory in a given direction. The first junction point is determined so that the flight duration between the first and second junction points or along said portion corresponds to a defined duration. The first junction point can also be determined so that the flight distance between the first and second junction points or along said portion corresponds to a defined distance.

The offset lateral trajectory may comprise a second junction point with the initial lateral trajectory, an offset waypoint for each initial waypoint situated between the first and second junction points, and a portion passing through the offset waypoints, said portion being situated at a defined offset distance from the initial lateral trajectory in a given direction. According to a first embodiment of the invention, the first junction point is determined so that the flight duration between the first and second junction points or along said portion corresponds to a defined duration. According to a second embodiment of the invention, the first junction point is determined so that the flight distance between the first and second junction points or along said portion corresponds to a defined distance. The first junction point may form either a point of exit from the offset lateral trajectory, or a point of entry to the offset lateral trajectory.

According to another particular embodiment of the invention, the offset lateral trajectory comprises offset waypoints associated with consecutive initial waypoints, the offset waypoints defining a portion of the offset lateral trajectory situated at a defined offset distance from the initial lateral trajectory in a given direction, the first junction point being defined from one of the offset waypoints. In particular, the first junction point may form a point of entry to the offset lateral trajectory, the position of the first junction point then being determined so that the offset waypoint following the first junction point is the first point of the offset lateral trajectory situated at the offset distance from the initial lateral trajectory. Alternatively, the first junction point may form a point of exit from the offset lateral trajectory, the position of the latter junction point then being determined so that the offset waypoint preceding the first junction point is the final point of the offset lateral trajectory situated at the offset distance from the initial lateral trajectory.

According to another particular embodiment of the invention, the first junction point is defined from one of the initial waypoints or from the current position of the aircraft. In particular, the first junction point can be determined so that the flight duration between the current position of the aircraft or an initial waypoint, and the first junction point, corresponds to a defined duration. It can also be determined so that the flight distance between the current position of the aircraft or an initial waypoint, and the first junction point, corresponds to a defined distance. The first junction point is situated either upstream of an initial waypoint, or downstream of an initial waypoint or of the current position of the aircraft.

The advantage of the invention is notably that it makes it possible for the offset lateral trajectory to begin and end independently of the waypoints of the initial lateral trajectory, while retaining these waypoints as reference points for the offset lateral trajectory.

BRIEF DESCRIPTION OF THE DRAWINGS

The invention will be better understood and other advantages will become apparent on reading the following description, given in light of the appended drawings in which.

DETAILED DESCRIPTION

Figure 1:
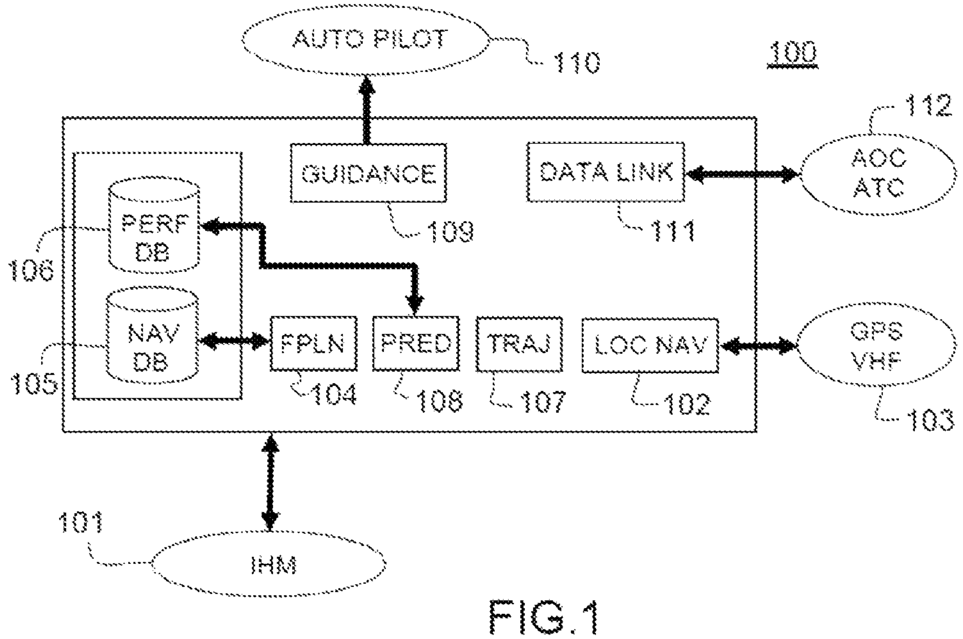
FIG. 1 schematically represents a flight management system for an aircraft.

FIG. 1 is a functional representation of a flight management system for an aircraft. A flight management system is commonly referred to as FMS. The FMS 100 represented in FIG. 1 comprises a human-machine interface 101 and modules fulfilling the various functions described by the ARINC 702 standard entitled "Advanced Flight Management Computer System". The human-machine interface 101 comprises, for example, a keyboard and a display screen, or a touch display screen. A navigation module 102, called "LOC NAV", makes it possible to optimally locate the aircraft as a function of geolocation means 103, for example a satellite location system (GPS or GALILEO), VHF radio navigation beacons, or inertial units. A flight plan determination module 104, called "FPLN", makes it possible to input the geographic elements that make up the skeleton of the route to be followed, such as the points imposed by the departure and arrival procedures, the waypoints, and the air corridors or "airways". A navigation database 105, called "NAV DB", contains data relating to the waypoints, to the beacons, and to the portions of trajectories, also called "legs". It makes it possible to construct geographic routes and flight procedures. A performance database 106, called "PERF DB", contains information relating to the aerodynamic parameters and the performance levels of the engines of the aircraft. A lateral trajectory determination module 107, called "TRAJ", makes it possible to construct a continuous trajectory from the points of the flight plan, that observes the performance levels of the aircraft and the containment constraints. A prediction module 108, called "PRED", makes it possible to construct an optimized vertical profile on the lateral trajectory. A guidance module 109, called "GUIDANCE", makes it possible to guide the aircraft in the vertical plane and the lateral plane on its three-dimensional trajectory, while optimizing its speed. This module 109 is linked to the automatic pilot 110. Finally, digital link means 111, called "DATALINK", allow communication with control centres and other aircraft 112.

The present invention proposes to determine an offset lateral trajectory in which the points of entry and exit differ from the waypoints in the flight plan. In order to clearly distinguish the offset lateral trajectory from the lateral trajectory constructed from the points of the flight plan, the latter is qualified as initial lateral trajectory hereinafter in the description. The waypoints of the initial lateral trajectory are also called initial waypoints. The waypoints defining the offset lateral trajectory are called offset waypoints. Each offset waypoint is defined in relation to an initial waypoint as a function of a lateral distance, also called offset distance or lateral offset distance, and of a direction. The direction takes the value right or left. The offset distance is defined as being the distance between a point of the initial lateral trajectory and its orthogonal projection on the offset lateral trajectory. In other words, it is the distance between a segment of the initial lateral trajectory contained between two initial waypoints and the corresponding segment of the offset lateral trajectory. Offset waypoints are constructed for each of the initial waypoints situated between the point of entry and the point of exit of the offset trajectory. The points of entry and exit are also called junction points. A first offset waypoint is defined between the point of entry and the offset waypoint constructed from the initial waypoint following the point of entry. This first offset waypoint corresponds to the first point of the offset lateral trajectory situated at the defined offset distance. A final offset waypoint is also defined between the point of exit and the offset waypoint associated with the initial waypoint immediately preceding the point of exit. This final offset waypoint corresponds to the final point of the offset lateral trajectory situated at the defined offset distance. The portion of offset lateral trajectory contained between the first and final offset waypoints is called portion with constant offset. The portion contained between the point of entry and the first offset waypoint is called portion rejoining the portion with constant offset; and the portion contained between the final offset waypoint and the point of exit is called portion rejoining the initial trajectory.

Figure 2:
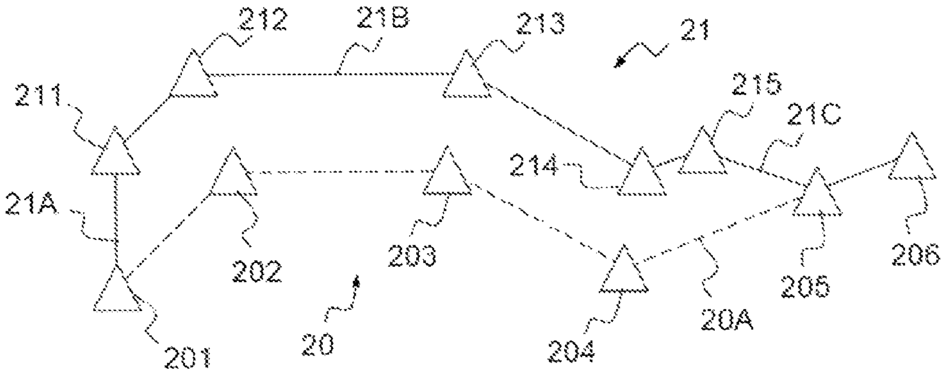
FIG. 2 represents a first exemplary offset lateral trajectory according to the prior art.

FIG. 2 represents an exemplary offset lateral trajectory of the "max possible offset" type for a given initial lateral trajectory. The initial lateral trajectory 20 comprises a waypoint 201 corresponding to the current position of the aircraft, and initial waypoints identified as 202 to 206. The segment 20A contained between the initial waypoints 204 and 205 constitutes the final segment of the initial lateral trajectory that can be offset. The offset lateral trajectory 21 comprises a first offset waypoint 211 following the waypoint 201, offset waypoints 212 to 214 associated respectively with the initial waypoints 202 to 204, and a final offset waypoint 215 immediately preceding the initial waypoint 205. The waypoints 201 and 205 correspond respectively to the point of entry and to the point of exit of the offset lateral trajectory 21. The portion 21B with constant offset is contained between the points 211 and 215. The flight management system of the aircraft may, for example, define the point 211 from the point of entry 201 and from a value for the angle formed between the segment contained between the points 201 and 202, and the portion 21A rejoining the portion 21B with constant offset. Similarly, the point 215 may be defined from the point of exit 215 and from a value for the angle formed between the segment contained between the points 204 and 205, and the portion 21C rejoining the initial trajectory.

Figure 3:
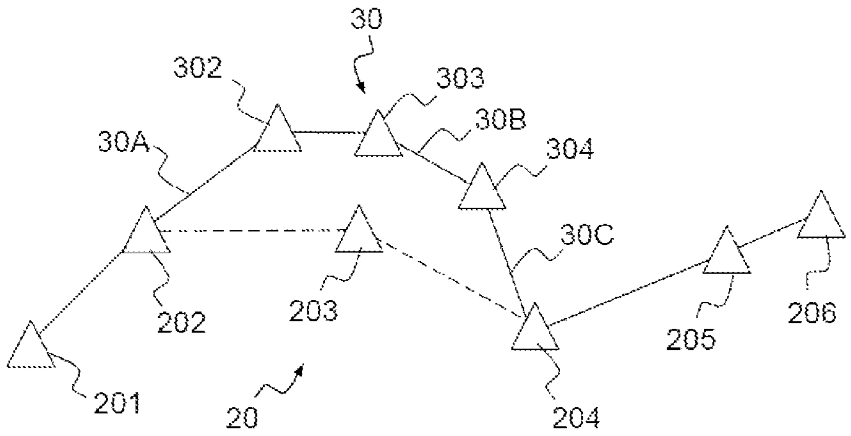
FIG. 3 represents a second exemplary offset lateral trajectory according to the prior art.

FIG. 3 represents an exemplary offset lateral trajectory of "offset from A to B" type for the initial lateral trajectory of FIG. 2. The offset lateral trajectory 30 is defined between the initial waypoints 202 and 204. It comprises a first offset waypoint 302 following the waypoint 202, a waypoint 303 associated with the initial waypoint 203, and a final offset waypoint 304 immediately preceding the initial waypoint 204. The portion 30B with constant offset is contained between the offset waypoints 302 and 304. The portion 30A rejoining the portion 30B with constant offset is contained between the points 202 and 302, and the portion 30C rejoining the initial trajectory 20 is contained between the points 304 and 204. As for the offset lateral trajectory of FIG. 2, the points 302 and 304 can be defined from the initial waypoints 202 and 204, respectively, and from an angle value.

According to the invention, the points of entry and exit of the offset lateral trajectory differ from the initial waypoints and from the current position of the aircraft. These junction points can be defined in different ways. In a first embodiment, the point of exit from the offset lateral trajectory is determined as a function of a desired flight duration along the offset lateral trajectory. In a second embodiment, the point of exit is determined as a function of a desired flight distance along the offset lateral trajectory. In a third embodiment, the point of entry to the offset lateral trajectory is determined so that the first offset waypoint is associated with a selected initial waypoint. In other words, the point of entry is determined so that the portion with constant offset of the offset lateral trajectory begins at an offset waypoint associated with an initial waypoint. In a fourth embodiment, the point of exit from the offset lateral trajectory is determined so that the final offset waypoint is associated with a selected initial waypoint. In other words, the point of exit is determined so that the portion with constant offset ends at an offset waypoint associated with an initial waypoint. In a fifth embodiment, the point of entry to the offset lateral trajectory is determined as a function of a desired flight distance between the current position of the aircraft or an initial waypoint, and said point of entry. In a sixth embodiment, the point of entry to the offset lateral trajectory is determined as a function of a desired flight duration between the current position of the aircraft or an initial waypoint, and said point of entry. The choice of one of these embodiments can notably be made by means of the human-machine interface 101 of the flight management system of the aircraft.

Figure 4:
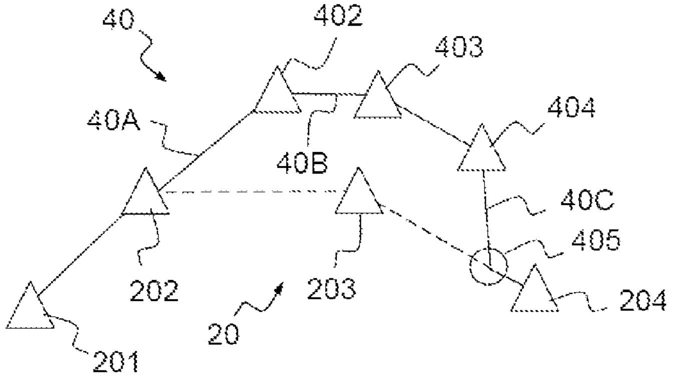
FIG. 4 represents an exemplary offset lateral trajectory with a point of exit determined as a function of a desired flight duration.

FIG. 4 illustrates an example of the first embodiment of an offset lateral trajectory according to the invention. This figure shows the part of the initial lateral trajectory 20 of FIGS. 2 and 3 contained between the initial waypoints 201 and 204. The offset lateral trajectory 40 comprises a first offset waypoint 402 following the point of entry 202, an offset waypoint 403 associated with the initial waypoint 203, and a final offset waypoint 404 preceding a point of exit 405. The position of this point of exit 405 along the initial lateral trajectory is determined as a function of a desired flight duration. The duration considered may correspond either to the flight duration along the portion 40B with constant offset, or to the flight duration all along the offset lateral trajectory 40, that is to say along the portions 40A, 40B and 40C. The final offset waypoint 404 is determined as a function of the position of the point of exit 405, for example using a value for the angle formed between the segment contained between the initial waypoints 203 and 204 and the portion 40C rejoining the initial trajectory. The parameters to be defined, for example by the pilot of the aircraft, for this type of offset trajectory therefore comprise a point of entry, an offset distance, a direction, a flight duration on the offset lateral trajectory, and the information according to which the duration should or should not include the rejoining portions 40A and 40C. It should be noted that the point of entry 202 may also correspond to the current position of the aircraft.

Figure 5:
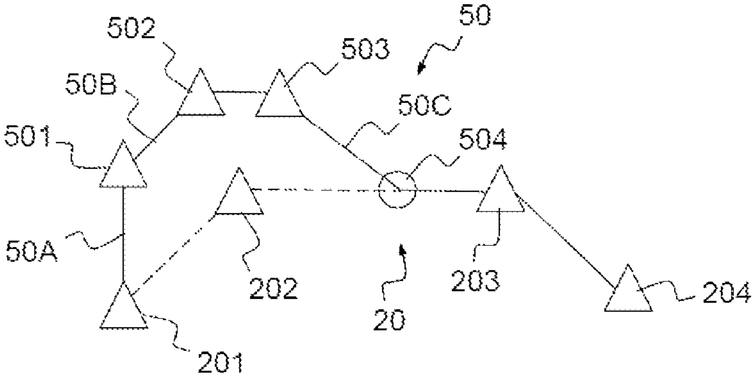
FIG. 5 represents an exemplary offset lateral trajectory with a point of exit determined as a function of a desired flight distance.

FIG. 5 illustrates an example of the second embodiment of an offset lateral trajectory according to the invention. The initial lateral trajectory 20 is identical to that of FIG. 4. The offset lateral trajectory 50 comprises a first offset waypoint 501 following the point of entry 201, an offset waypoint 502 associated with the initial waypoint 202, and a final offset waypoint 503 immediately preceding a point of exit 504. The position of this point of exit 504 along the initial lateral trajectory is determined as a function of a desired flight distance. The distance considered may correspond either to the flight distance along the portion 50B with constant offset, or to the flight distance all along the offset lateral trajectory 50, that is to say along the portions 50A, 50B and 50C. The final offset waypoint 503 is determined as a function of the position of the point of exit 504, for example using a value for the angle formed between the segment contained between the initial waypoints 202 and 203 and the portion 50C rejoining the initial lateral trajectory. The parameters to be defined, for example by the pilot of the aircraft for this type of offset trajectory therefore comprise a point of entry, an offset distance, a direction, a flight distance on the offset lateral trajectory, and the information according to which the distance should or should not include the rejoining portions 40A and 40C. It should be noted that the point of entry 201 may also correspond to the current position of the aircraft.

Figure 6:
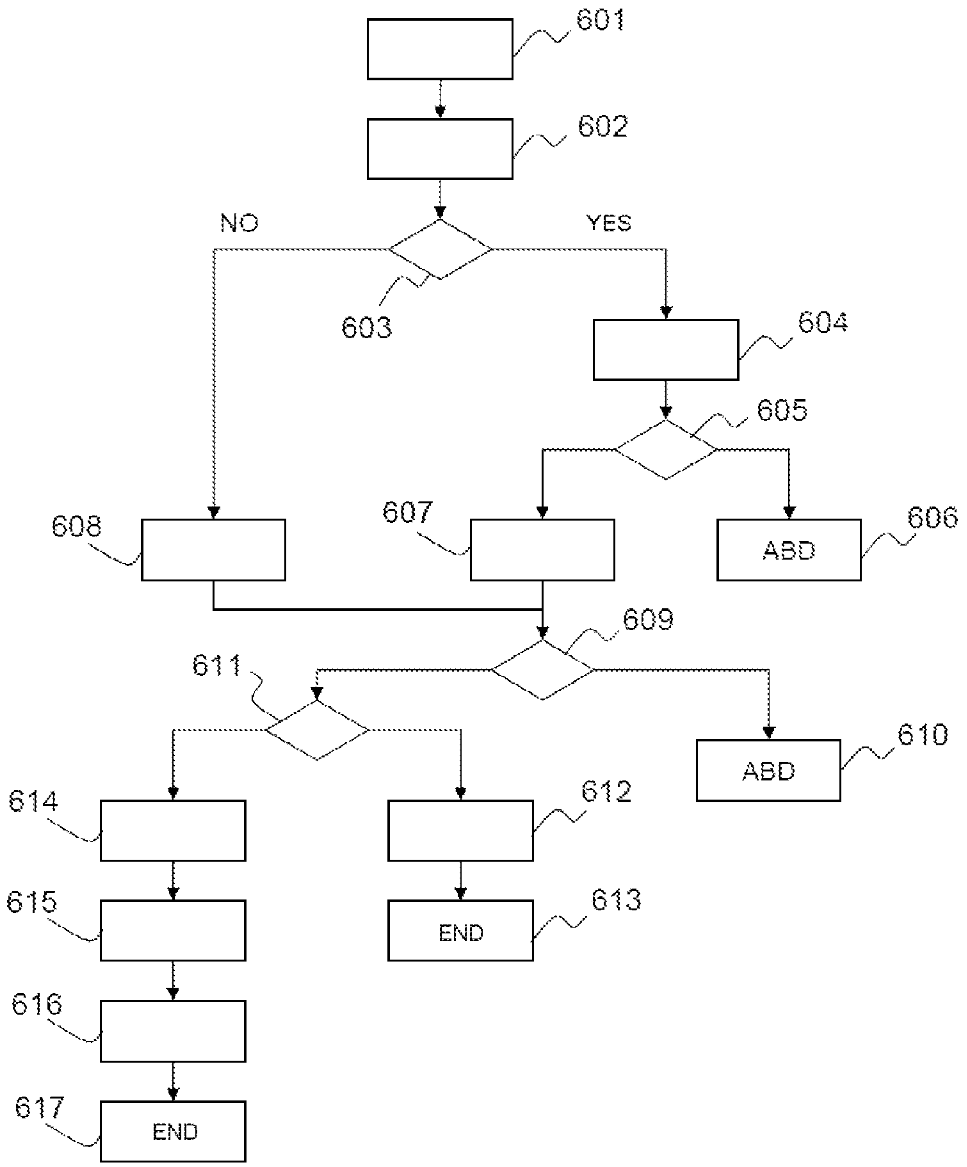
FIG. 6 represents an exemplary method making it possible to determine the offset lateral trajectory of FIG. 5.

FIG. 6 represents an exemplary method making it possible to determine an offset lateral trajectory defined as a function of a desired flight distance. The method can also be used to determine an offset lateral trajectory defined as a function of a desired flight duration, by converting the desired flight duration into distance from the predicted speeds of the aircraft at the different waypoints. For the description of this method, it is considered by way of example that the offset lateral trajectory is computed by a flight management system of an aircraft. The following notations are defined:

- L: a first flight distance variable. This variable takes as its initial value the flight distance along the offset lateral trajectory;
- Tol: a tolerance distance. This parameter corresponds to the maximum error allowed over the flight distance along the offset lateral trajectory;
- L1: a second flight distance variable along the rejoining portion of the portion with constant offset;
- L_offset_max: a maximum flight distance on the portion with constant offset;
- L_max: a third flight distance variable used by the method;
- L_offset_temp: a fourth flight distance variable used by the method;
- L_temp: a fifth flight distance variable used by the method;
- L_back_temp: a sixth flight distance variable used by the method;
- P_in: the first offset waypoint, that is to say the point of intersection between the portion with constant offset and the portion rejoining this portion;
- P_out: the final offset waypoint, that is to say the point of intersection between the portion with constant offset and the portion rejoining the initial lateral trajectory;
- P_max: the final offset waypoint P_out, considering the flight distance L_offset_max;
- L_back_max: a flight distance along the portion rejoining the initial lateral trajectory starting from the waypoint P_max;
- P_temp: a waypoint situated along the portion with constant offset at the distance L_offset_temp from the first offset waypoint P_in.

In a first step 601 of the method, the pilot defines the desired flight distance along the offset lateral trajectory L, the tolerance distance Tol, and the point of entry to the offset lateral trajectory. These parameters could also be defined by air traffic control. In a second step 602, the portion rejoining the portion with constant offset is computed. This step 602 can be carried out by taking into account the point of entry and an angle value. It makes it possible to define the first offset waypoint P_in. The step 602 also comprises a determination of the offset waypoint P_max. P_max is determined by backward computation of the trajectory rejoining the initial trajectory from the final point of the initial trajectory which can be offset. The measurement of the distance between P_max and P_in gives the maximum flight distance L_offset_max. The measurement of the portion rejoining the initial lateral trajectory computed previously is stored in the variable L_back_max. In a third step 603, a check is carried out to see if the aircraft is following the portion rejoining the portion with constant offset determined in the step 602. If such is the case, the distance L1 of this rejoining portion is subtracted from the flight distance L in a step 604 (new distance L=old distance L−L1). On completion of this step 604, the sign of the new distance L is checked in a step 605. If this distance is negative, the method is terminated in a step 606, the lateral offset not being feasible. If the new distance L is positive, the flight distance L_max is determined in a step 607. This flight distance L_max is computed as being equal to the sum of the maximum flight distance on the portion with constant offset L_offset_max and the flight distance along the portion rejoining the initial lateral trajectory L_back_max (L_max=L_offset_max+L_back_max). If, in the step 603, it has been determined that the aircraft was not following the portion rejoining the portion with constant offset, a step 608 in which the flight distance L_max is determined is carried out following this step 603. This flight distance L_max is then equal to the maximum flight distance on the portion with constant offset L_offset_max (L_max=L_offset_max). On completion of the steps 607 and 608, a check is carried out in a step 609 to see if the flight distance L is less than the flight distance L_max. If such is not the case, the method is terminated in a step 610, the lateral offset not being feasible. On the other hand, if the flight distance L is less than the flight distance L_max, a check is carried out in a step 611 to see if the aircraft is following the portion rejoining the initial lateral trajectory. If such is not the case, in a step 612, the portion with constant offset is computed as a function of the flight distance L. This step makes it possible to define the final offset waypoint P_out. The step 612 also comprises a computation of the portion rejoining the initial lateral trajectory from the point P_out. On completion of the step 612, the method is terminated in a step 613, all of the offset lateral trajectory having been determined. If, in the step 611, it has been determined that the aircraft was following the portion rejoining the initial lateral trajectory, a step 614 is carried out following this step 611 in which step 614 the flight distances L_offset_temp and L_temp are initialized with the zero value. In a step 615, the following substeps are repeated as long as the difference between the flight distance L and the flight distance L_temp is greater than the tolerance distance Tol (|L−L_temp|>Tol). In a first substep, the waypoint P_temp is determined as being situated on the portion with constant offset at the flight distance L_offset_temp from the first offset waypoint P_in. In the first iteration, the waypoint P_temp is thus initialized on the first offset waypoint P_in. In a second substep, the flight distance along the portion rejoining the initial lateral trajectory L_back_temp from the waypoint P_temp is determined. In a third substep, the value of the flight distance L_temp is determined. This flight distance L_temp is computed as being equal to the sum of the flight distance L_offset_temp and the flight distance L_back_temp (L_temp =L_offset_temp+L_back_temp). In a fourth substep, the new value of the flight distance L_offset_temp is determined. This flight distance L_offset_temp is computed as being equal to the sum of the flight distance L_offset_temp and the tolerance distance Tol (new distance L_offset_temp = old distance L_offset_temp +Tol). In a step 616, the final offset waypoint P_out is defined as being situated on the waypoint P_temp determined on completion of the step 615. The step 616 also comprises a determination of the remaining part of the offset lateral trajectory, that is to say the portion with constant offset between the first offset waypoint P_in and the final offset waypoint P_out, as well as the portion rejoining the initial lateral trajectory. In a step 617, the method is terminated.

In the method described with reference to FIG. 6, the flight distance L_temp along the portion with constant offset is determined by an iterative loop by means of the step 615. This flight distance L_temp could alternatively be determined by a dichotomy loop.

Figure 7:
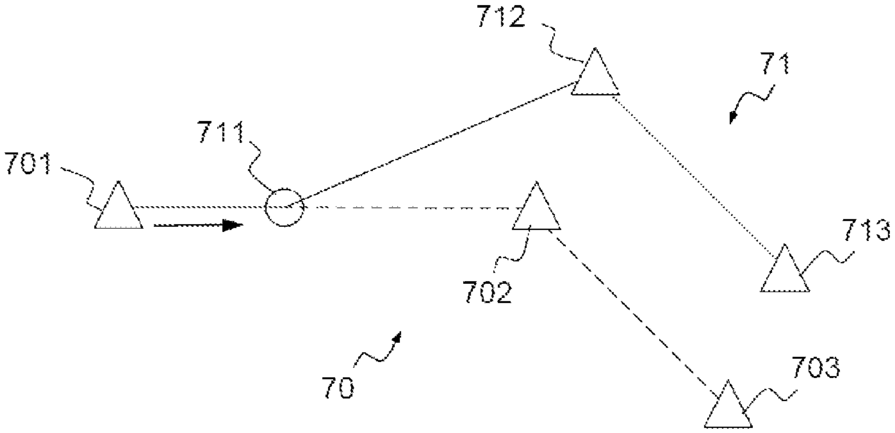
FIG. 7 represents an exemplary offset lateral trajectory with a point of entry determined so that the first point of the offset lateral trajectory situated at a defined distance from the initial lateral trajectory is merged with an offset waypoint associated with the waypoint of the initial lateral trajectory following the point of entry.

FIG. 7 illustrates an example of the third embodiment of an offset lateral trajectory according to the invention. In this third embodiment, the point of entry to the offset lateral trajectory is determined so that the first offset waypoint is associated with a selected initial waypoint. In other words, the portion with constant offset begins "at" an initial waypoint. Thus, the point of entry is defined from one of the initial waypoints, but without coinciding with one of these points. In the example of FIG. 7, the initial lateral trajectory 70 comprises a series of initial waypoints 701 to 703. The offset lateral trajectory 71 comprises a point of entry 711 between the initial waypoints 701 and 702, a first offset waypoint 712 associated with the initial waypoint 702, and a second offset waypoint 713 associated with the initial waypoint 703. The point of entry 711 is determined so that the first point of the offset lateral trajectory situated at a defined distance from the initial lateral trajectory is merged with the offset waypoint 712.

Figure 8:
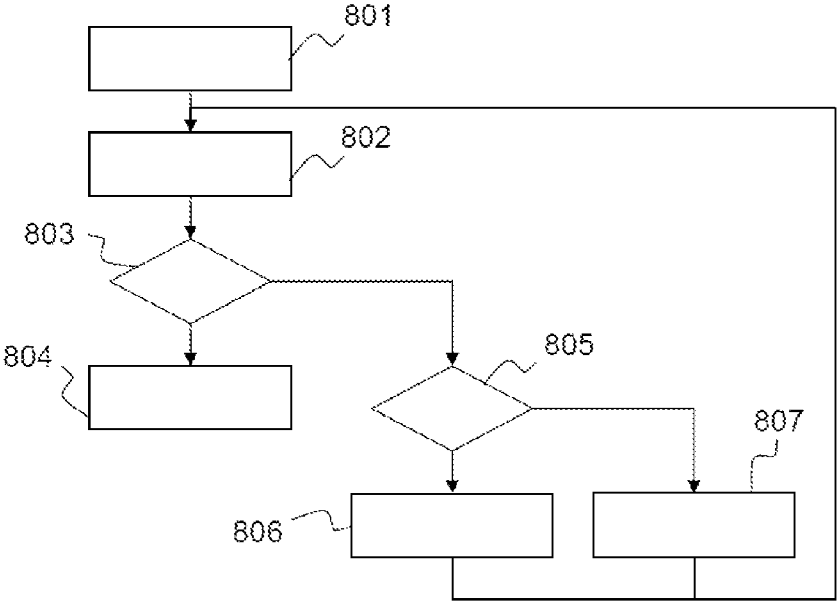
FIG. 8 represents an exemplary method making it possible to determine the point of entry of the offset lateral trajectory of FIG. 7.

Unlike the case where the offset lateral trajectory begins on an initial waypoint and where the point of entry is known information, the third embodiment requires the point of entry to be computed. A first solution consists in computing this point of entry by a so-called "backward" computation. A second solution consists in determining the point of entry by a method comprising a so-called "forward" computation in an iterative loop. FIG. 8 illustrates an example of such a method. In a first step 801, a point of entry is set for the first iteration. It is, for example, the current position of the aircraft, or a point situated on the initial lateral trajectory at a given distance from the selected initial waypoint, which serves as a reference for the first offset waypoint. In a second step 802, a first offset waypoint is determined by a "forward" computation starting from the point of entry of the current iteration. The flight management system can notably determine this first offset waypoint from a value for the angle formed between the segment of the initial lateral trajectory on which the point of entry is located, and the portion rejoining the portion with constant offset. In a third step 803, a determination is made as to whether the first offset waypoint of the current iteration is situated on the desired first offset waypoint. Preferably, a tolerance margin is defined for this waypoint. If it is determined, in the step 803, that the first offset waypoint of the current iteration is situated effectively on the desired first offset waypoint or in its vicinity, the method is terminated in a step 804. Otherwise, a determination is made in a step 805 as to whether the first offset waypoint of the current iteration is upstream or downstream of the desired first offset waypoint. If it is downstream, a new point of entry for the next iteration is determined in a step 806, this point being offset upstream by the distance between the desired first offset waypoint and the first offset waypoint of the current iteration. On completion of this step, there is a return to the step 802 for a new iteration. If the first offset waypoint of the current iteration is upstream of the desired first offset waypoint, a new point of entry downstream of the point of entry of the current iteration is determined in a step 807. This new point of entry is offset downstream by the distance between the first offset waypoint of the current iteration, and the desired first offset waypoint. On completion of the step 807, there is a return to the step 802 for a new iteration.

Figure 9:
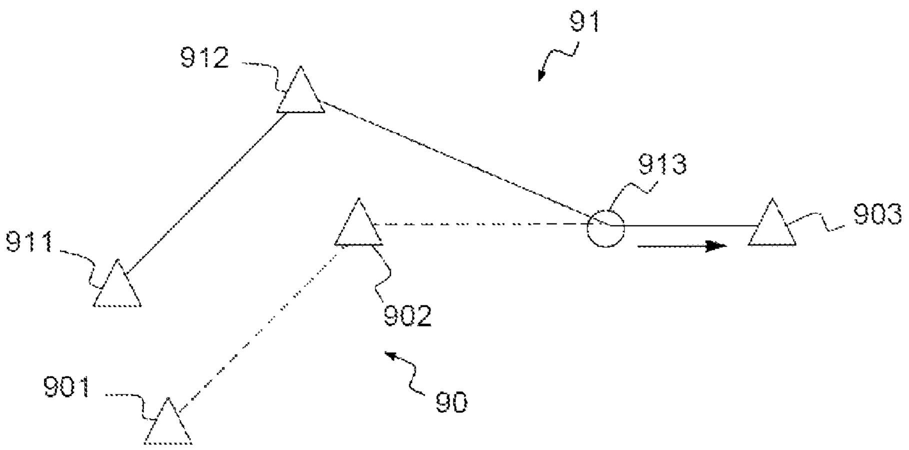
FIG. 9 represents an exemplary offset lateral trajectory with a point of exit determined so that the final point of the offset lateral trajectory situated at a defined distance from the initial lateral trajectory is merged with an offset waypoint associated with the waypoint of the initial lateral trajectory immediately preceding the point of exit.

FIG. 9 illustrates an example of the fourth embodiment of an offset lateral trajectory according to the invention. In this fourth embodiment, the point of exit from the offset lateral trajectory is determined so that the final offset waypoint is associated with a selected initial waypoint. In other words, the portion with constant offset ends "at" an initial waypoint. Thus, the point of exit is defined from one of the initial waypoints, but without coinciding with one of these points. In the example of FIG. 9, the initial lateral trajectory 90 comprises a series of initial waypoints 901 to 903. The offset lateral trajectory 91 comprises a first offset waypoint 911 associated with the initial waypoint 901, a second offset waypoint 912 associated with the initial waypoint 902, and a point of exit 913. This point of exit 913 is determined so that the final point of the offset lateral trajectory situated at a defined distance from the initial lateral trajectory is merged with the offset waypoint 912. The point of exit 913 and the portion rejoining the initial trajectory can be determined by a simple "forward" computation.

According to a fifth method for determining an offset lateral trajectory according to the invention, the point of entry to the offset lateral trajectory is determined as a function of a desired flight distance between the current position of the aircraft or an initial waypoint, and said point of entry. Thus, the point of entry is defined as a function of an initial waypoint, but without coinciding with one of the initial waypoints. Also, the first offset waypoint does not coincide with one of the offset waypoints each associated with an initial waypoint either. In the case where the point of entry is determined in relation to an initial waypoint, the point of entry may be located upstream or downstream of this waypoint.

According to a sixth embodiment, the point of entry to the offset lateral trajectory is determined as a function of a desired flight duration between the current position of the aircraft or an initial waypoint, and said point of entry. The determination of the point of entry can be performed by converting the desired flight duration into an equivalent flight distance as a function of the aircraft speed prediction information at the various initial waypoints preceding the reference initial waypoint.

The invention claimed is:

1. A method of determining and forwarding an offset lateral trajectory for an aircraft from an initial lateral trajectory comprising initial waypoints, the method being executed by a flight management system comprising at leak one processor and a storage device storing a navigation database storing waypoints, the offset lateral trajectory rejoining the initial lateral trajectory at first and second junction points, the method comprising:

determining the first junction point within the initial lateral trajectory, the first junction point being different from the initial waypoints and from a current position of the aircraft, the first junction point being determined based on:

a predetermined direction and a defined offset distance from said initial lateral trajectory, a predetermined flight duration on said offset lateral trajectory with an associated tolerance, or a predetermined flight distance on said offset lateral trajectory with associated tolerance, and a predetermined second junction point within the initial lateral trajectory;

determining, and storing in the navigation database, an offset waypoint for each initial waypoint situated between the first and second junction points;

defining a portion of the offset lateral trajectory passing through the offset waypoints, such that the portion of the offset lateral trajectory is the same offset distance from a corresponding portion of the initial lateral trajectory in the predetermined direction; and forwarding the determined offset lateral trajectory from the flight management system to an autopilot system of the aircraft to guide the aircraft along the determined offset lateral trajectory, wherein the first junction point is determined such that:

a flight duration between the first and second junction points along the offset lateral trajectory or along said portion of the offset lateral trajectory is equal to the predetermined flight duration taking into account the associated tolerance, or a flight distance between the first and second junction points along the offset lateral trajectory or along said portion of the offset lateral trajectory is equal to the predetermined flight distance taking into account the associated tolerance.

2. The method according to claim 1, wherein the first junction point forms a point of exit from the offset lateral trajectory.

3. The method according to claim 1, wherein the first junction point forms a point of entry to the offset lateral trajectory.

* * * * *